(12) United States Patent
Gulati et al.

(10) Patent No.: US 12,707,414 B2
(45) Date of Patent: Aug. 11, 2026

(54) SIDELINK-ASSISTED POSITIONING

(71) Applicant: QUALCOMM Incorporated, San Diego, CA (US)

(72) Inventors: Kapil Gulati, Belle Mead, NJ (US); Sudhir Kumar Baghel, Pleasanton, CA (US); Hong Cheng, Basking Ridge, NJ (US); Chang-Sik Choi, Seoul (KR); Alexandros Manolakos, Escondido, CA (US); Shuanshuan Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 631 days.

(21) Appl. No.: 17/996,417

(22) PCT Filed: Apr. 22, 2021

(86) PCT No.: PCT/US2021/070446
§ 371 (c)(1),
(2) Date: Oct. 17, 2022

(87) PCT Pub. No.: WO2021/226616
PCT Pub. Date: Nov. 11, 2021

(65) Prior Publication Data

US 2023/0199699 A1 Jun. 22, 2023

(30) Foreign Application Priority Data

May 4, 2020 (GR) .............................. 20200100222

(51) Int. Cl.
*H04W 64/00* (2009.01)
*G01S 5/00* (2006.01)
(Continued)

(52) U.S. Cl.
CPC ........... *H04W 64/00* (2013.01); *G01S 5/0036* (2013.01); *G01S 5/0072* (2013.01); *G01S 5/0236* (2013.01);
(Continued)

(58) Field of Classification Search
CPC ..... H04W 64/00; H04W 92/18; H04W 8/005; H04W 8/24; H04W 4/40; H04W 24/10;
(Continued)

(56) References Cited

U.S. PATENT DOCUMENTS 12,213,136 B2 1/2025 Park et al.
12,363,738 B2 * 7/2025 Zhao .................... H04L 5/0094
(Continued)

FOREIGN PATENT DOCUMENTS

EP 3543731 A1 9/2019
JP 3630252 B2 * 3/2005
(Continued)

OTHER PUBLICATIONS

1 Taiwan Search Report—TW110114678—TIPO—Oct. 30, 2024.
(Continued)

*Primary Examiner* — Siu M Lee
(74) *Attorney, Agent, or Firm* — Thien T. Nguyen

(57) ABSTRACT

Various aspects of the present disclosure generally relate to wireless communication. In some aspects, a user equipment (UE) may transmit, to another UE, a positioning request associated with a procedure for determining a position of the UE, wherein the positioning request comprises a sidelink communication between a first sidelink location management component (S-LMC) of the UE and a second S-LMC of the other UE, wherein the first S-LMC and the second S-LMC comprise sub-functions associated with a vehicle-to-everything protocol layer; and receive a positioning report associated with the procedure for determining the
(Continued)

position of the UE, wherein the positioning report comprises an indication of the position of the UE based at least in part on a determination by a sidelink location management function. Numerous other aspects are provided.

77 Claims, 9 Drawing Sheets

(51) Int. Cl.
*G01S 5/02* (2010.01)
*H04W 92/18* (2009.01)

(52) U.S. Cl.
CPC ....... *G01S 5/0289* (2013.01); *G01S 2205/008* (2013.01); *H04W 92/18* (2013.01)

(58) Field of Classification Search
CPC .... G01S 5/0036; G01S 5/0072; G01S 5/0236; G01S 5/0289; G01S 2205/01; G01S 2205/008
See application file for complete search history.

(56) References Cited

U.S. PATENT DOCUMENTS

2016/0183113 A1 6/2016 Dua
2017/0150314 A1 5/2017 Hwang et al.
2017/0332192 A1 11/2017 Edge
2019/0028947 A1* 1/2019 Adachi ................. H04W 76/27
2019/0124489 A1* 4/2019 Ahmad ................... H04W 4/70
2019/0230618 A1 7/2019 Saur et al.
2019/0274130 A1 9/2019 Cheng et al.
2020/0267517 A1* 8/2020 el Essaili .............. H04W 76/11
2020/0314796 A1* 10/2020 Lee ....................... H04W 68/02
2020/0329352 A1* 10/2020 Wang ...................... H04L 67/12
2021/0160810 A1* 5/2021 Zhang ....................... G01S 5/10
2021/0329510 A1* 10/2021 Tseng .................... H04W 76/27
2021/0367657 A1* 11/2021 Chen ...................... H04B 7/086
2022/0043099 A1* 2/2022 Da ........................ H04L 5/0048
2022/0236365 A1* 7/2022 Ko .......................... G01S 7/006
2022/0286254 A1* 9/2022 Cha ...................... H04B 17/373
2022/0322147 A1* 10/2022 Hu ........................ H04W 76/14
2022/0346011 A1* 10/2022 Hong .................... H04W 52/02
2023/0076030 A1* 3/2023 Baek ................... H04W 64/006
2023/0125710 A1* 4/2023 Gulati ....................... G01S 5/02
455/456.1
2023/0198708 A1* 6/2023 Hong ........................ G01S 5/00
370/329

FOREIGN PATENT DOCUMENTS

WO WO-2016105745 A1 6/2016
WO WO-2017080782 A1 * 5/2017 ............ H04W 72/23
WO WO-2019027245 A1 2/2019
WO WO-2019222645 A1 * 11/2019 ........... B65G 1/1371
WO 2020030116 A1 2/2020
WO WO-2020223664 A1 * 11/2020 ........... H04L 1/1812
WO WO-2021092813 A1 * 5/2021 ........... G01S 5/0009

OTHER PUBLICATIONS

Ericsson Lm: "Revision of ETSI EN 302 637-3 V1.2.2 (Nov. 2014), DENM for C-V2X and Facility Layer Security", ETSI Draft, ITSWG1(18)044007R1, Intelligent Transport Systems (ITS), Vehicular Communications, Basic Set of Applications, Part 3: Specifications of Decentralized Environmental Notification Basic Service, European Telecommunications Standards Institute (ETSI), 650, Route Des Lucioles, F-06921 Sophia-Antipolis, France, vol. WG ITS WG1 Application Requirements and Services Jun. 26, 2018, 73 Pages, XP014315300.

International Search Report and Written Opinion—PCT/US2021/070446—ISA/EPO—Jul. 26, 2021.

Xu B., et al., "Release 4", TR-0055-3GPP_V2X_INTERWORKING-V0_5_0.ZIP, ONEM2M, vol. Work Programme, Work Progr, No., Version=V0.5.0, Sep. 5, 2019 (Sep. 5, 2019), pp. 1-16, XP084031992, Retrieved from the Internet: URL: https://member.onem2m.org/Application/documentapp/downloadimmediate/default.aspx?dociD=30468TR-0055-3GPP_V2X_Interworking-V0_5_0.ZIP TocR-0055-3GPP_V2X_Interworking-V0_5_0(cl).DOC, [retrieved on Sep. 5, 2019], Sections 5.1 and 6.

Huawei, et al., "Further Update of Solution 15 for Enhancement to LCS Architecture", SA WG2 Meeting #129, S2-1811105, Oct. 15-19, 2018, Dongguan, P.R China, Oct. 17, 2018, 7 Pages.

* cited by examiner

SIDELINK-ASSISTED POSITIONING

CROSS-REFERENCE TO RELATED APPLICATIONS

This patent application is a 371 national stage of PCT Application No. PCT/US2021/070446 filed on Apr. 22, 2021, entitled "SIDELINK-ASSISTED POSITIONING," which claims priority to Greek patent application No. 20200100222, filed on May 4, 2020, entitled "SIDELINK-ASSISTED POSITIONING," and assigned to the assignee hereof. The disclosure of the prior Applications are considered part of and are incorporated by reference into this Patent Application.

FIELD OF THE DISCLOSURE

Aspects of the present disclosure generally relate to wireless communication and to techniques and apparatuses for sidelink-assisted positioning.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include transmitting, to another UE, a positioning request associated with a procedure for determining a position of the UE, wherein the positioning request comprises a sidelink communication between a first sidelink location management component (S-LMC) of the UE and a second S-LMC of the other UE, wherein the first S-LMC and the second S-LMC comprise sub-functions associated with a vehicle-to-everything (V2X) protocol layer; and receiving a positioning report associated with the procedure for determining the position of the UE, wherein the positioning report comprises an indication of the position of the UE based at least in part on a determination by a sidelink location management function (S-LMF).

In some aspects, a method of wireless communication, performed by a UE, may include receiving, from another UE, a positioning request associated with a procedure for determining a position of the other UE, wherein the positioning request comprises a sidelink communication between a first S-LMC of the UE and a second S-LMC of the other UE, wherein the first S-LMC and the second S-LMC comprise sub-functions associated with a V2X protocol layer; receiving, from an S-LMF, a positioning report associated with the procedure for determining the position of the other UE, wherein the positioning report comprises an indication of the position of the UE based at least in part on a determination by the S-LMF; and transmitting the positioning report to the other UE.

In some aspects, a UE for wireless communication may include a memory and one or more processors operatively coupled to the memory. The memory and the one or more processors may be configured to transmit, to another UE, a positioning request associated with a procedure for determining a position of the UE, wherein the positioning request comprises a sidelink communication between a first S-LMC of the UE and a second S-LMC of the other UE, wherein the first S-LMC and the second S-LMC comprise sub-functions associated with a V2X protocol layer; and receive a positioning report associated with the procedure for determining the position of the UE, wherein the positioning report comprises an indication of the position of the UE based at least in part on a determination by an S-LMF.

In some aspects, a UE for wireless communication may include a memory and one or more processors operatively coupled to the memory. The memory and the one or more processors may be configured to receive, from another UE, a positioning request associated with a procedure for determining a position of the other UE, wherein the positioning request comprises a sidelink communication between a first S-LMC of the UE and a second S-LMC of the other UE, wherein the first S-LMC and the second S-LMC comprise sub-functions associated with a V2X protocol layer; receive, from an S-LMF, a positioning report associated with the procedure for determining the position of the other UE, wherein the positioning report comprises an indication of the position of the UE based at least in part on a determination by the S-LMF; and transmit the positioning report to the other UE.

In some aspects, a non-transitory computer-readable medium may store one or more instructions for wireless communication. The one or more instructions, when executed by one or more processors of a UE, may cause the one or more processors to transmit, to another UE, a positioning request associated with a procedure for determining a position of the UE, wherein the positioning request comprises a sidelink communication between a first S-LMC of the UE and a second S-LMC of the other UE, wherein the first S-LMC and the second S-LMC comprise sub-functions associated with a V2X protocol layer; and receive a positioning report associated with the procedure for determining the position of the UE, wherein the positioning report comprises an indication of the position of the UE based at least in part on a determination by an S-LMF.

In some aspects, a non-transitory computer-readable medium may store one or more instructions for wireless communication. The one or more instructions, when executed by one or more processors of a UE, may cause the one or more processors to receive, from another UE, a positioning request associated with a procedure for determining a position of the other UE, wherein the positioning request comprises a sidelink communication between a first S-LMC of the UE and a second S-LMC of the other UE, wherein the first S-LMC and the second S-LMC comprise sub-functions associated with a V2X protocol layer; receive, from an S-LMF, a positioning report associated with the procedure for determining the position of the other UE, wherein the positioning report comprises an indication of the position of the UE based at least in part on a determination by the S-LMF; and transmit the positioning report to the other UE.

In some aspects, an apparatus for wireless communication may include means for transmitting, to another apparatus, a positioning request associated with a procedure for determining a position of the apparatus, wherein the positioning request comprises a sidelink communication between a first S-LMC of the apparatus and a second S-LMC of the other apparatus, wherein the first S-LMC and the second S-LMC comprise sub-functions associated with a V2X protocol layer; and means for receiving a positioning report associated with the procedure for determining the position of the apparatus, wherein the positioning report comprises an indication of the position of the apparatus based at least in part on a determination by an S-LMF.

In some aspects, an apparatus for wireless communication may include means for receiving, from another apparatus, a positioning request associated with a procedure for determining a position of the other apparatus, wherein the positioning request comprises a sidelink communication between a first S-LMC of the apparatus and a second S-LMC of the other apparatus, wherein the first S-LMC and the second S-LMC comprise sub-functions associated with a V2X protocol layer; means for receiving, from an S-LMF, a positioning report associated with the procedure for determining the position of the other apparatus, wherein the positioning report comprises an indication of the position of the apparatus based at least in part on a determination by the S-LMF; and means for transmitting the positioning report to the other apparatus.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
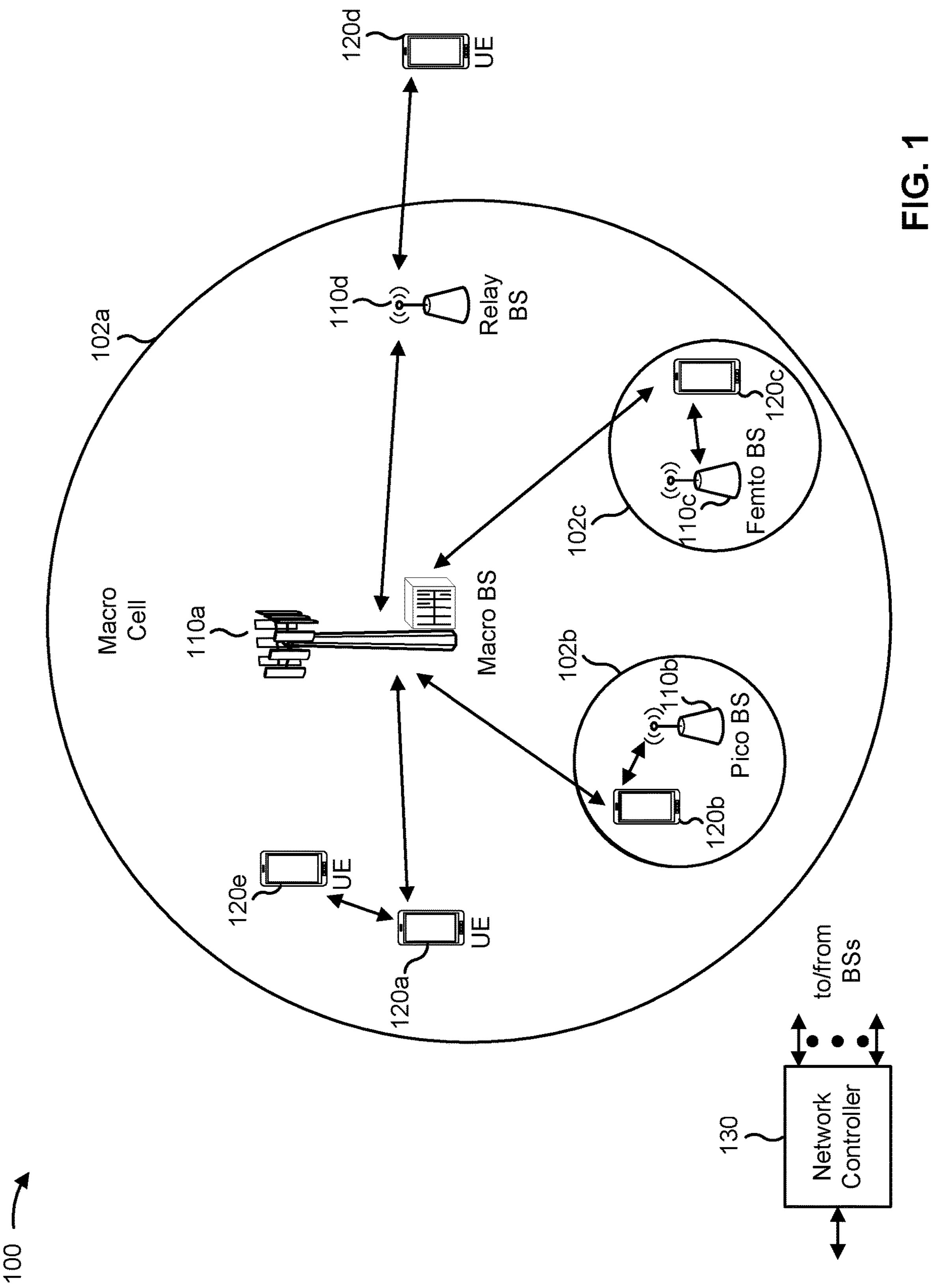
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
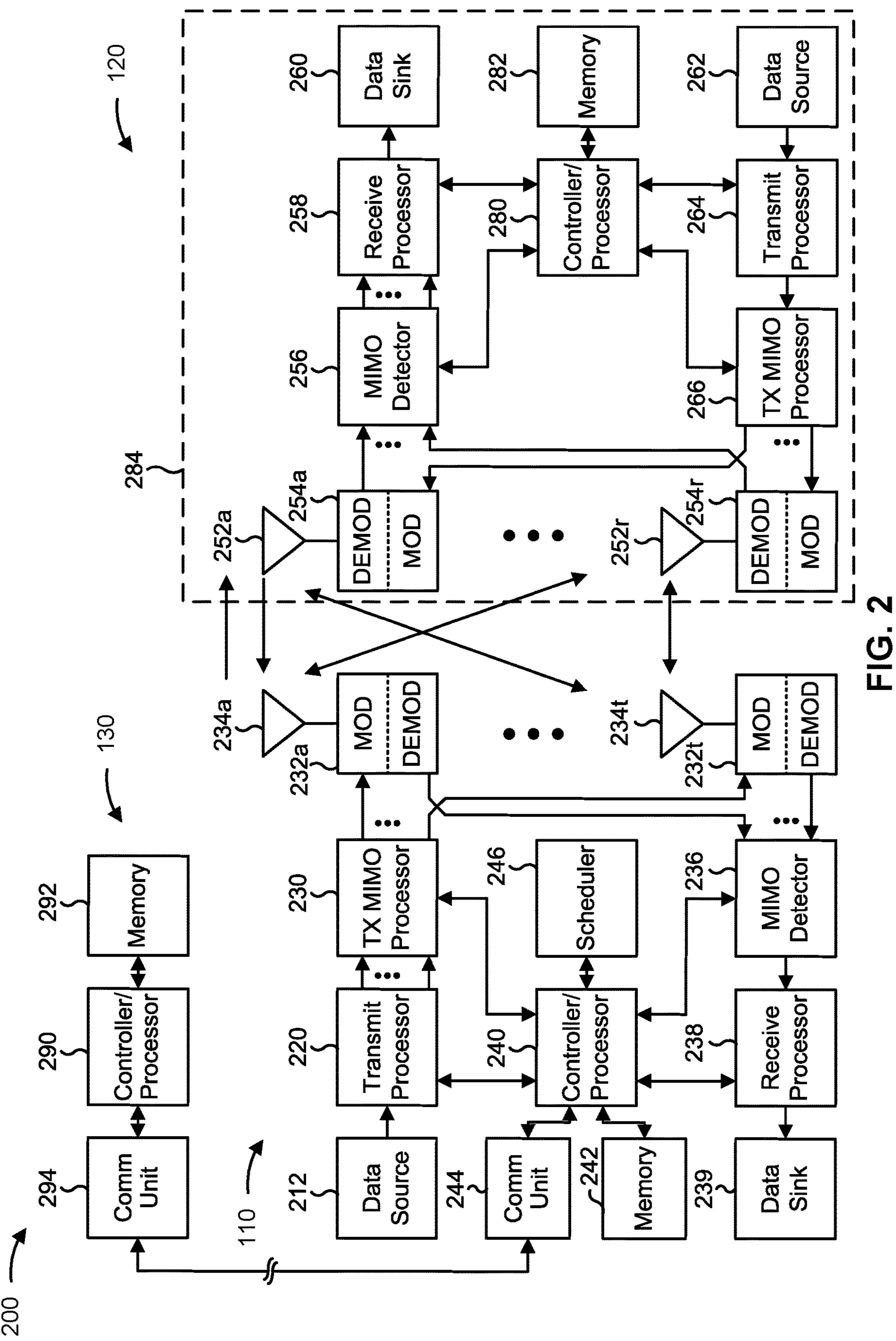
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 5-9.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 5-9.

Controller/processor 240 of base station 110, controller/processor 280 of UE 120, and/or any other component(s) of FIG. 2 may perform one or more techniques associated with sidelink-assisted positioning, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some aspects, executing instructions may include running the instructions, converting the instructions, compiling the instructions, and/or interpreting the instructions, among other examples.

In some aspects, UE 120 may include means for transmitting, to another UE, a positioning request associated with a procedure for determining a position of the UE, wherein the positioning request comprises a sidelink communication between a first (S-LMC) of the UE and a second S-LMC of the other UE, wherein the first S-LMC and the second S-LMC comprise sub-functions associated with a V2X protocol layer, means for receiving a positioning report associated with the procedure for determining the position of the UE, wherein the positioning report comprises an indication of the position of the UE based at least in part on a determination by a sidelink location management function (S-LMF), and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, UE 120 may include means for receiving, from another UE, a positioning request associated with a procedure for determining a position of the other UE, wherein the positioning request comprises a sidelink communication between a first S-LMC of the UE and a second S-LMC of the other UE, wherein the first S-LMC and the second S-LMC comprise sub-functions associated with a V2X protocol layer, means for receiving, from an S-LMF, a positioning report associated with the procedure for determining the position of the UE, wherein the positioning report comprises an indication of the position of the UE based at least in part on a determination by the S-LMF, means for transmitting the positioning report to the other UE, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
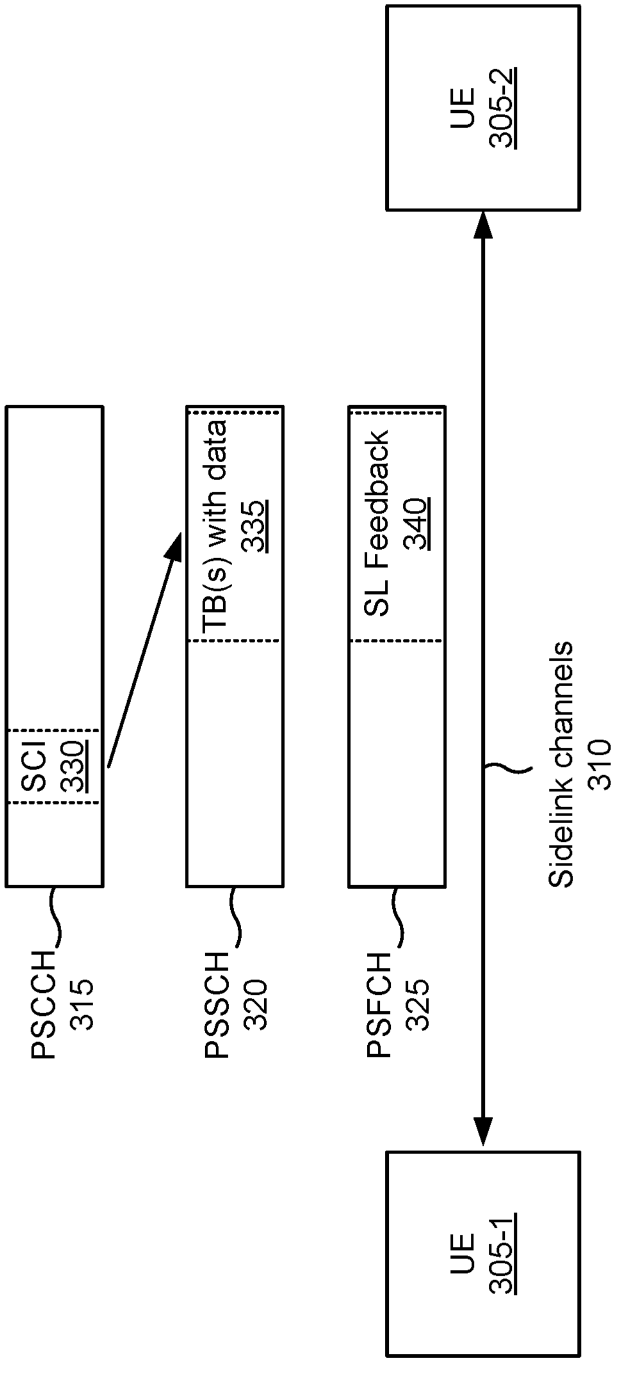
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or vehicle-to-pedestrian (V2P) communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
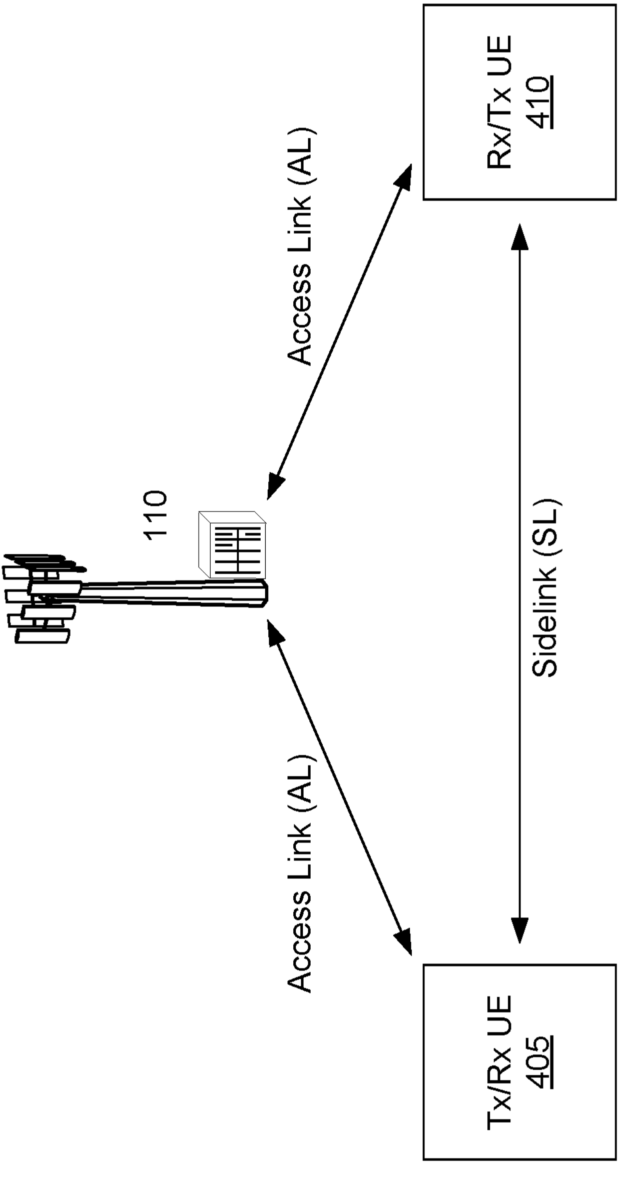
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

V2X positioning may involve a UE associated with a vehicle or pedestrian positioning itself using other UEs associated with roadside units (RSUs), other vehicles, other pedestrians, and/or the like. V2X positioning may include, for example, infrastructure-to-vehicle (I2V) positioning, V2V positioning, V2P positioning, and/or the like.

V2X positioning methods may differ from access link (Uu)-based UE positioning methods. In Uu-based positioning, a location management function (LMF) maintained in the NR core network determines the position of the UE based on input from the UE and/or measurements obtained by the RAN (e.g., a base station, and/or the like). Uu-based positioning may be beneficial in that computation is performed in the core network, which may offer large amounts of computational power. However, a UE does not always have access to the core network. Moreover, to support Uu-based positioning, signaling overhead may be introduced between the UE, one or more base stations, the core network, and/or the like. Uu-based positioning may also have accuracy limitations due to using measurements only from the UE being positioned and/or a base station with which the UE communicates.

V2X positioning may leverage vehicle mobility and accurate information of the vehicle velocity. For example, while a particular position of a UE may be unknown to the UE, relative displacement over consecutive time instances may be known accurately, using motion sensors associated with the vehicle. Vehicle motion may enable large changes in angular positions relative to anchor devices, which are devices that are not moving such as, for example, RSUs, and/or the like. Multiple time measurements can thus be used to improve position accuracy.

In sidelink-based positioning, a UE associated with a vehicle may determine the UE's position using positioning reference signal (PRS)-based measurements made by the UE associated with the vehicle and/or by anchor UEs. In this way, the UE may benefit from the vehicle's knowledge of its own velocity, velocity errors, global positioning system (GPS) measurement, GPS errors, and/or the like. The UE may use this information, transmission-receive calibration errors, and/or the like to determine the UE's position based at least in part on multiple measurements in time. The UE may determine its position without relying on another entity such as an RSU, central server, and/or the like. However, the accuracy of the position determination may be limited by the single perspective from which the measurements are obtained and/or calculated.

Various aspects of techniques and apparatuses described herein may facilitate sidelink-assisted positioning using an LMF and multiple UEs. In some aspects, the LMF may be hosted by the network operator and maintained in the NR core network. In some aspects, the LMF may be hosted by a road operator and may be maintained in a V2X application server. In some aspects, sidelink-assisted positioning may benefit from measurements based on multiple perspectives. In some aspects, a determination of a UE's position may be more accurate when it is based at least in part on positioning measurements obtained by different UEs, as each of the UEs will have a different perspective of the UE's movement relative thereto. In some aspects, a UE's position is determined using sidelink-based measurements. In some aspects, an S-LMC is provided as a sub-function in the V2X layer of UEs. The S-LMC may support one or more functionalities that enable sidelink-assisted positioning. In some aspects, the S-LMC may support most, or all, of the functions typically provided by a network-operated LMF.

In some aspects, a UE associated with a vehicle may obtain positioning measurements using round trip time (RTT) measurements based on communications with another UE. The other UE may be associated with another vehicle, an RSU, and/or the like. In some aspects, the UEs may transmit PRSs to one another and obtain positioning measurements associated with the UE based on the PRSs. The other UE may provide positioning measurements to the LMF (either directly, or through another UE), and the LMF may determine its position based at least in part on the received positioning measurements from the UE, other UEs, and/or the like. In this way, an LMF may determine a UE's position using input from other devices that represent other perspectives. Having the computations performed by the LMF may save the UE power and time, as the UE does not have to perform the computations.

Figure 5:
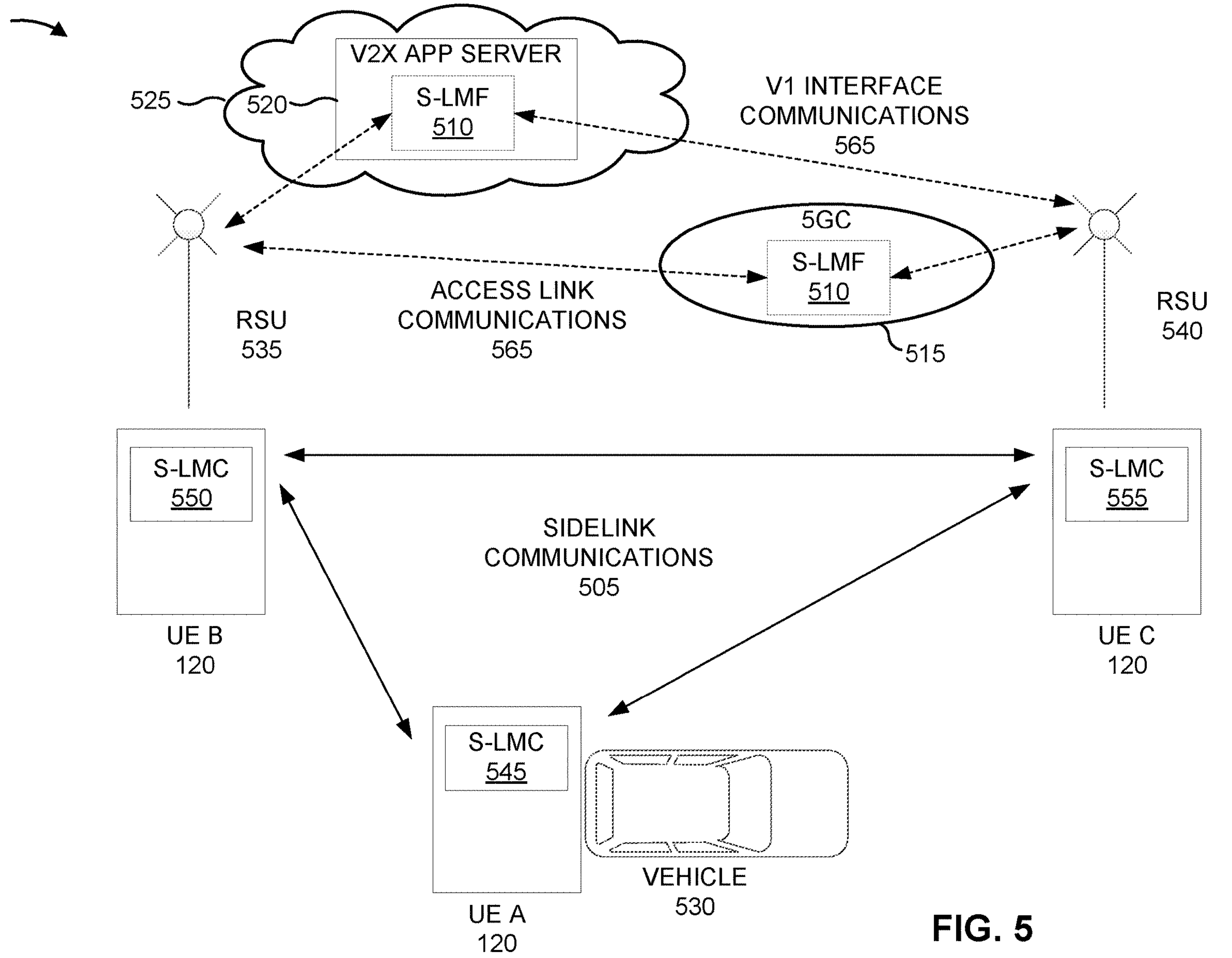
FIG. 5 is a diagram illustrating an example of an architecture for sidelink-assisted positioning, in accordance with the present disclosure.

FIG. 5 is a diagram illustrating an example 500 of an architecture for sidelink-assisted positioning, in accordance with the present disclosure. As shown, a first UE 120 (shown as "UE A"), a second UE 120 (shown as "UE B"), and a third UE 120 (shown as "UE C") may communicate with one another via sidelink communications 505. In some aspects, the sidelink communications 505 may include PC5 signaling. As shown in FIG. 5, the UE B 120 and the UE C 120 may communicate with an S-LMF 510. In some aspects, the UE B 120 and the UE C 120 may communicate with one another through the S-LMF 510.

In some aspects, the S-LMF 510 may be controlled by a 5G network operator and may be maintained in the 5G core network (shown as "5GC") 515. In aspects in which the S-LMF 510 is maintained in the 5GC 515, the UE B 120 and/or the UE C 120 may communicate with the S-LMF 510 using an LTE positioning protocol (LPP). In some aspects, the S-LMF 510 may be controlled by a road operator, V2X application operator, and/or the like. The S-LMF 510 may be maintained in a V2X application server 520 (shown as "V2X App Server"). The UE B 120 and/or UE C 120 may communicate with the S-LMF 510 maintained by the V2X application server 520 using a V1 interface through a communication network 525 such as the Internet, and/or the like. In some aspects, the UE B 120 and/or UE C 120 may communicate with one another through the S-LMF 510.

In some aspects, any one or more of the UE A 120, UE B 120, and UE C 120 may be associated with a pedestrian, a vehicle, an RSU, and/or the like. As shown in FIG. 5, in some aspects, the UE A 120 may be associated with a vehicle 530, the UE B 120 may be associated with a first RSU 535, and the UE C 120 may be associated with a second RSU 540.

As is further shown in FIG. 5, UE A 120 may include a first S-LMC 545, UE B 120 may include a second S-LMC 550, and UE C 120 may include a third S-LMC 555. The S-LMCs 545, 550, and 555 may be provided in a V2X protocol layer in the protocol stack associated with each UE 120. In some aspects, one or more of the S-LMCs 545, 550, and 555 may support one or more operations similar to operations that may be supported by an LMF 510. In some aspects, communications between UEs 120 described herein may refer to communications between respective S-LMCs of the UEs 120. Similarly, in some aspects, communications between UEs 120 and the S-LMF 510 described herein may refer to communications between respective S-LMCs of the UEs 120 and the S-LMF 510. In some aspects, one or more of the S-LMCs 545, 550, and 555 may support all of the operations typically supported by an LMF. In some aspects, for example, one or more of the S-LMCs 545, 550, and 555 may support a capability request operation, a capability response operation, an assistance data receipt operation, an assistance data provision operation, a measurement operation, a measurement receipt operation, a first location determination operation associated with the UE, a second location determination operation associated with the other UE, and/or the like.

Various aspects of the example 500 architecture depicted in FIG. 5 may be configured to support UE positioning scenarios in which an S-LMF determines a position of a UE based on information received from a number of UEs that may communicate with one another using sidelink communications. Some aspects of the example 500 architecture shown in FIG. 5 may support aspects of the sidelink-assisted positioning methods shown in, and described below in connection with, FIGS. 6-9.

In some aspects, the S-LMF 510 may determine the position of the UE A 120. The UE B 120 and/or the UE C 120 may determine the position of the UE A 120 based at least in part on positioning measurements obtained by the UE A 120, the UE B 120, the UE C 120, and/or the like. In some aspects, the positioning measurements may include RTT measurements made by one or more of the UEs 120 based on PRS transmissions via the sidelink communications 505.

The S-LMF 510 may receive positioning measurements from the UE A 120, UE B 120, the UE C 120, and/or the like. In some aspects, the S-LMF 510 may obtain positioning measurements associated with the UE A 120 based on PRS transmissions, vehicle sensors (e.g., wheel sensors, and/or the like), and/or the like. In some aspects, the UE B 120 and the UE C 120 may coordinate with one another through the S-LMF 510 to share measurements with the S-LMF 510. The S-LMF 510 may determine a position of the UE A 120 based at least in part on one or more of the positioning measurements.

Various aspects of techniques and apparatuses described herein may facilitate sidelink-assisted positioning using an S-LMF and multiple UEs. In some aspects, a UE associated with a vehicle may obtain positioning measurements using RTT measurements based on communications with another UE. In some aspects, an S-LMF may determine a UE's position using input from other devices that represent other perspectives. Having the computations performed by the S-LMF may save the UEs power, processing resources, and/or the like.

As indicated above, FIG. 5 is provided as an example. Other examples may differ from what is described with respect to FIG. 5.

Figure 6:
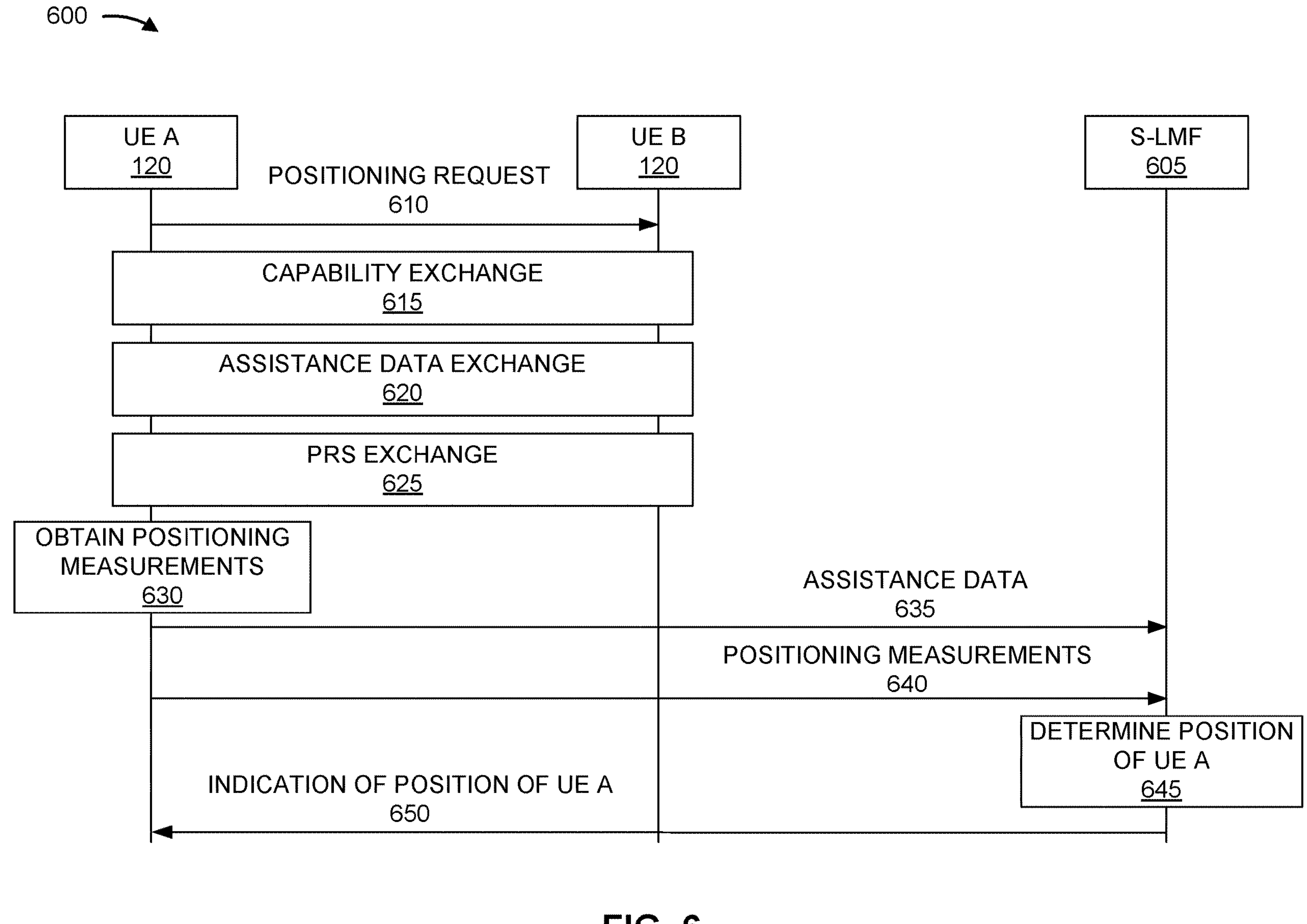
FIGS. 6 and 7 are diagrams illustrating examples of sidelink-assisted positioning, in accordance with the present disclosure.

FIG. 6 is a diagram illustrating an example 600 of sidelink-assisted positioning, in accordance with the present disclosure. As shown, a first UE 120 (shown as "UE A") and a second UE 120 (shown as "UE B") may communicate with one another via sidelink communications. The UE A 120 also may communicate with an S-LMF 605 via uplink communications, V2X communications, and/or the like.

As shown by reference number 610, the UE A 120 may transmit, and the UE B 120 may receive, a positioning request. The positioning request may be associated with a procedure for determining a position of the UE A 120. In some aspects, the positioning request may include a sidelink communication between an S-LMC of the UE A 120 and an S-LMC of the UE B 120. In some aspects, sidelink communication may be performed using PC5 signaling messages.

As shown by reference number 615, the UE A 120 and the UE B 120 may engage in a capability exchange. In some aspects, the capability exchange may include the UE A 120 transmitting a capability request to the UE B 120, and the UE B 120 responding to the capability request by providing capability information associated with the UE B 120. Similarly, the capability exchange may include the UE B 120 transmitting a capability request to the UE A 120, and the UE A 120 responding by providing capability information associated with the UE A 120. In some aspects, capability information associated with a UE 120 may indicate an identification of the UE as an anchor UE (e.g., a UE that does not move, that is not moving, that will not move during a particular period of time, that moves slowly, and/or the like), one or more positioning measurements that the UE is capable of performing, a velocity sensor error, a calibration error, and/or the like.

As shown by reference number 620, the UE A 120 and the UE B 120 may engage in an assistance data exchange. In some aspects, the assistance data exchange may include the UE A 120 providing a first set of assistance data to the UE B 120. In some aspects, the assistance data exchange may include the UE B 120 providing a second set of assistance data to the UE A 120. In some aspects, the first set of assistance data may include a first set of PRS configuration information associated with the UE A 120, the UE B 120, and/or the like. In some aspects, the second set of assistance data may include a second set of PRS configuration information associated with the UE A 120, the UE B 120, and/or the like.

As shown by reference number 625, the UE A 120 and the UE B 120 may engage in a PRS exchange. In some aspects, the PRS exchange may include the UE B 120 transmitting a first PRS to the UE A 120. In some aspects, the first PRS may be based at least in part on the first set of assistance data. In some aspects, the PRS exchange may include the UE A 120 transmitting a second PRS to the UE B 120. In some aspects, the second PRS may be based at least in part on the second set of assistance data.

As shown by reference number 630, the UE A 120 may obtain positioning measurements associated with the UE A 120. In some aspects, the positioning measurements may be based at least in part on a PRS received from the UE B 120. In some aspects, the positioning measurements may include time difference of arrival (TDOA) measurements associated with the PRS, angle of arrival (AoA) measurements associated with the PRS, and/or the like. In some aspects, the UE A 120 may obtain a vehicle positioning measurement from a sensor associated with a vehicle corresponding to the UE A 120. In some aspects, the sensor may include a wheel sensor. In some aspects, the vehicle positioning measurement may include velocity information, acceleration information, and/or the like.

As shown by reference number 635, the UE A 120 may transmit, and the S-LMF 605 may receive, the assistance data exchanged between the UE A 120 and the UE B 120 that is discussed above. As shown by reference number 640, the UE A 120 may transmit, and the S-LMF 605 may receive, positioning measurements associated with the UE A 120. As shown by reference number 645, the S-LMF 605 may determine a position of the UE A 120. In some aspects, the S-LMF 605 may determine the position of the UE A 120 based at least in part on one or more of the positioning measurements received from the UE A 120. In some aspects, the S-LMF 605 may determine the position of the UE A 120 based at least in part on the assistance data received from the UE A 120 such as by interpreting the positioning measurements in the context of the assistance data.

As shown by reference number 650, the S-LMF 605 may transmit, and the UE A 120 may receive, an indication of the position of the UE A 120. In some aspects, the UE A 120 may determine the position of the UE A 120 by decoding the transmission containing the indication of the position of the UE A 120.

As indicated above, FIG. 6 is provided as an example. Other examples may differ from what is described with respect to FIG. 6.

Figure 7:
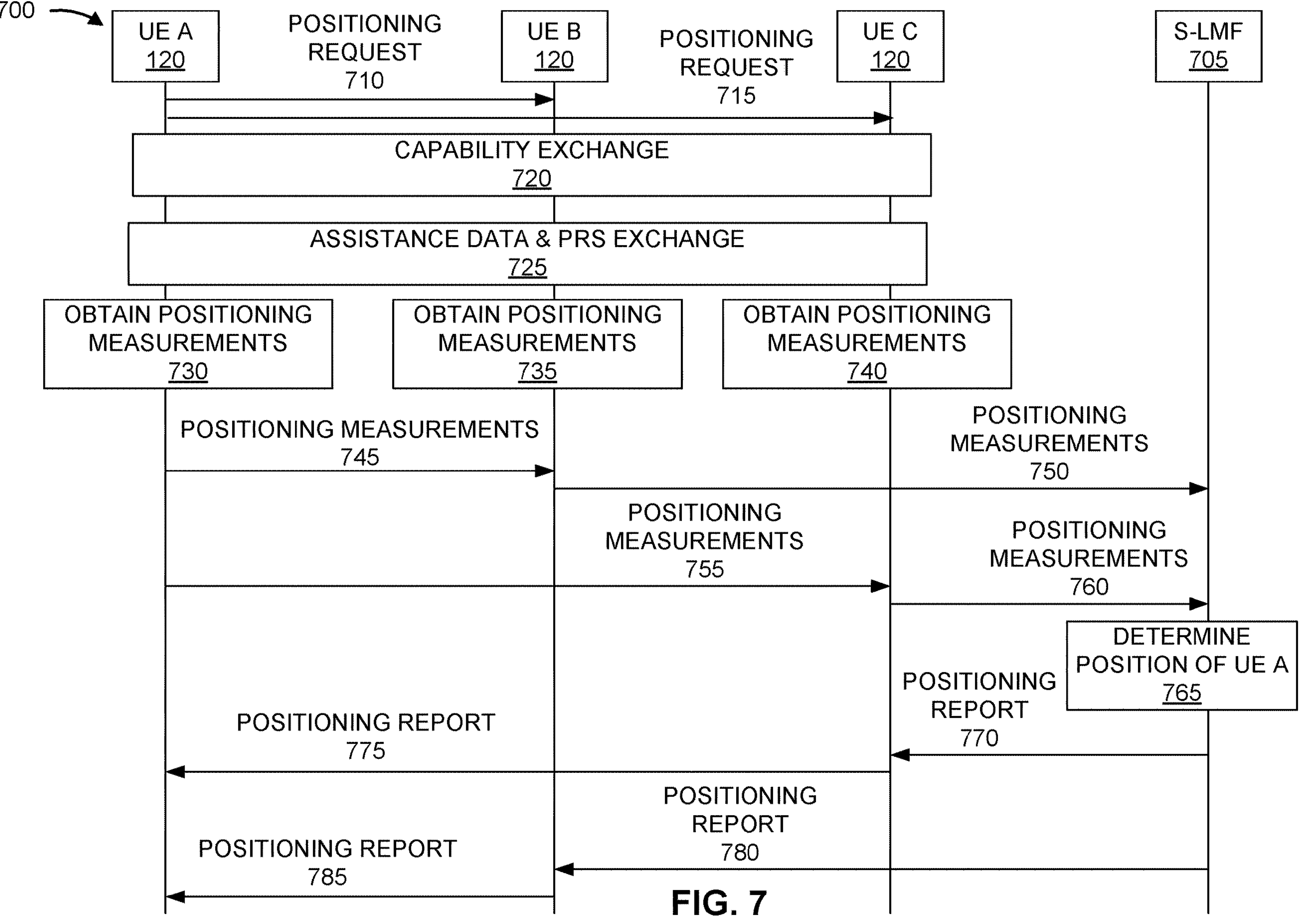

FIG. 7 is a diagram illustrating an example 700 of sidelink-assisted positioning, in accordance with the present disclosure. As shown, a first UE 120 (shown as "UE A"), a second UE 120 (shown as "UE B"), and a third UE 120 (shown as "UE C") may communicate with one another via sidelink communications. The UE B 120 and/or the UE C 120 also may communicate with an S-LMF 705 via uplink communications, V2X communications, and/or the like.

As shown by reference number 710, the UE A 120 may transmit, and the UE B 120 may receive, a first positioning request. As shown by reference number 715, the UE A 120 may transmit, and the UE C 120 may receive, a second positioning request. The first positioning request and the second positioning request may be associated with a procedure for determining a position of the UE A 120. In some aspects, the first and second positioning requests may include sidelink communications between an S-LMC of the UE A 120 and an S-LMC of the UE B 120 and an S-LMC of the UE C 120, respectively. In some aspects, sidelink communication may be performed using PC5 signaling messages.

As shown by reference number 720, the UE A 120, the UE B 120, and the UE C 120 may engage in a capability exchange. In some aspects, the capability exchange may include the UE A 120 transmitting a capability request to the UE B 120, and the UE B 120 responding to the capability request by providing capability information associated with the UE B 120. In some aspects, the capability exchange may include the UE B 120 transmitting a capability request to the UE A 120, and the UE A 120 responding by providing capability information associated with the UE A 120. In some aspects, the capability exchange may include the UE A 120 transmitting a capability request to the UE C 120, and the UE C 120 responding to the capability request by providing capability information associated with the UE C 120. In some aspects, the capability exchange may include the UE C 120 transmitting a capability request to the UE A 120, and the UE A 120 responding by providing capability information associated with the UE A 120.

In some aspects, capability information associated with a UE 120 may indicate an identification of the UE as an anchor UE (e.g., a UE that does not move, that is not moving, that will not move during a particular period of time, that moves slowly, and/or the like), one or more positioning measurements that the UE is capable of performing, a velocity sensor error, a calibration error, and/or the like.

As shown by reference number 725, the UE A 120, UE B 120, and the UE C 120 may engage in an assistance data and PRS exchange. In some aspects, the assistance data and PRS exchange may include the UE A 120 providing a first set of assistance data to the UE B 120. In some aspects, the assistance data and PRS exchange may include the UE B 120 providing a second set of assistance data to the UE A 120. In some aspects, the assistance data and PRS exchange may include the UE A 120 providing a third set of assistance data to the UE C 120. In some aspects, the assistance data and PRS exchange may include the UE C 120 providing a fourth set of assistance data to the UE A 120.

The first set of assistance data may include a first set of PRS configuration information associated with the UE A 120, the UE B 120, and/or the like. The second set of assistance data may include a second set of PRS configuration information associated with the UE A 120, the UE B 120, and/or the like. The third set of assistance data may include a third set of PRS configuration information associated with the UE A 120, the UE C 120, and/or the like. The fourth set of assistance data may include a fourth set of PRS configuration information associated with the UE A 120, the UE C 120, and/or the like.

In some aspects, the assistance data and PRS exchange may include the UE B 120 transmitting a first PRS to the UE A 120. In some aspects, the first PRS may be based at least in part on the first set of assistance data. In some aspects, the assistance data and PRS exchange may include the UE A 120 transmitting a second PRS to the UE B 120. In some aspects, the second PRS may be based at least in part on the second set of assistance data. In some aspects, the assistance data and PRS exchange may include the UE C 120 transmitting a third PRS to the UE A 120. In some aspects, the third PRS may be based at least in part on the third set of assistance data. In some aspects, the assistance data and PRS exchange may include the UE A 120 transmitting a fourth PRS to the UE C 120. In some aspects, the fourth PRS may be based at least in part on the fourth set of assistance data.

As shown by reference number 730, the UE A 120 may obtain positioning measurements associated with the UE A 120. In some aspects, the positioning measurements obtained by the UE A 120 may include positioning measurements obtained based at least in part on a received PRS (e.g., the first PRS transmitted by the UE B 120, the third PRS transmitted by the UE C 120, and/or the like). In some aspects, the positioning measurements may include TDOA measurements, AoA measurements, and/or the like. In some aspects, the UE A 120 may obtain a vehicle positioning measurement from a sensor associated with a vehicle corresponding to the UE A 120. In some aspects, the sensor may include a wheel sensor. In some aspects, the vehicle positioning measurement may include velocity information, acceleration information, and/or the like.

As shown by the reference number 735, the UE B 120 may obtain positioning measurements associated with the UE A 120. As shown by the reference number 740, the UE C 120 may obtain positioning measurements associated with the UE A 120. In some aspects, the positioning measurements may be based at least in part on one or more PRSs received by the UE B 120 (from the UE A 120), one or more PRSs received by the UE C 120 (from the UE A 120), and/or the like.

As shown by reference number 745, the UE A 120 may transmit, and the UE B 120 may receive, positioning measurements associated with the UE A 120 and obtained by the UE A 120, one or more errors associated with the positioning measurements, and/or the like. As shown by reference number 750, the UE B 120 may transmit, and the S-LMF 705 may receive, positioning measurements associated with the UE A 120. The positioning measurements transmitted by the UE B 120 to the S-LMF 705 may include positioning measurements received from the UE A 120, positioning measurements obtained by the UE B 120, and/or the like.

As shown by reference number 755, the UE A 120 may transmit, and the UE C 120 may receive, positioning measurements associated with the UE A 120 and obtained by the UE A 120, one or more errors associated with the positioning measurements, and/or the like. As shown by reference number 760, the UE C 120 may transmit, and the S-LMF 705 may receive, positioning measurements associated with the UE A 120. The positioning measurements transmitted by the UE C 120 to the S-LMF 705 may include positioning measurements received from the UE A 120, positioning measurements obtained by the UE C 120, and/or the like.

As shown by reference number 765, the S-LMF 705 may determine a position of the UE A 120. In some aspects, the S-LMF 705 may determine the position of the UE A 120 based at least in part on one or more of the positioning measurements received from the UE B 120 and/or the UE C 120. As shown by reference number 770, the S-LMF 705 may transmit, and the UE C 120 may receive, a positioning report that includes an indication of the position of the UE A 120. As shown by reference number 775, the UE C 120 may transmit, and the UE A 120 may receive, the positioning report. As shown by reference number 780, the S-LMF 705 may transmit, and the UE B 120 may receive, another positioning report that includes an indication of the position of the UE A 120. As shown by reference number 785, the UE B 120 may transmit, and the UE A 120 may receive, the positioning report.

In some aspects, the UE A 120 may determine the position of the UE A 120 by decoding one or more of the positioning report transmissions from UE B 120 and/or UE C 120. In some aspects, the indication of the position of the UE A 120 received from the UE B 120 may be different than the indication of the position of the UE A 120 received from the UE C 120. In some aspects, the UE A 120 may determine the position of the UE A 120 based at least in part on the indications of the positions received from the UE B 120 and the UE C 120. In some aspects, the UE A 120 may determine the position by considering errors indicated by the UE B 120 and/or the UE C 120, motion information associated with the UE B 120 and/or the UE C 120, and/or the like.

As indicated above, FIG. 7 is provided as an example. Other examples may differ from what is described with respect to FIG. 7.

Figure 8:
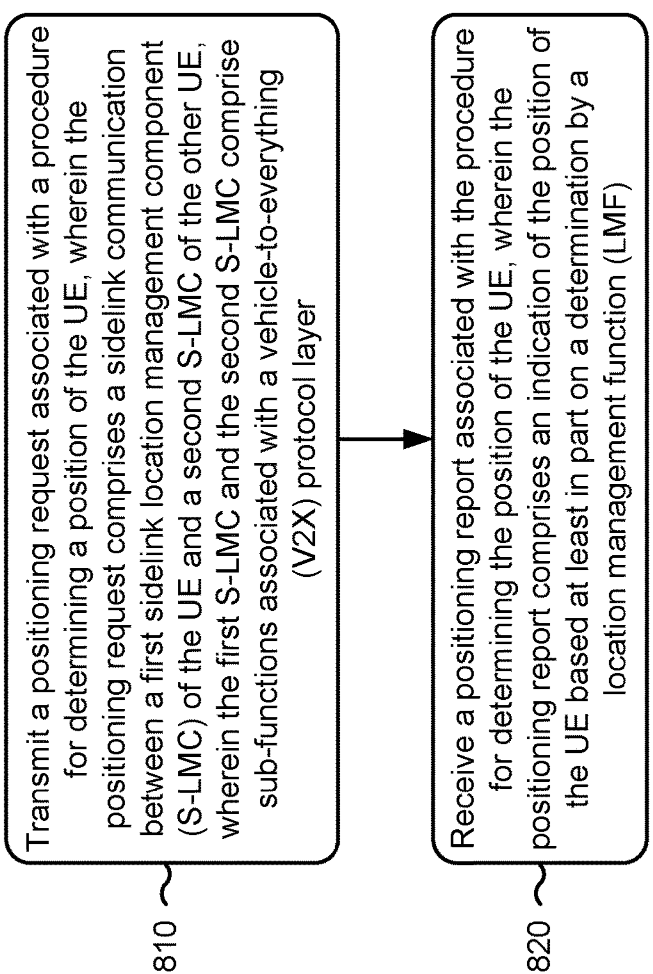
FIGS. 8 and 9 are diagrams illustrating example processes performed, for example, by a user equipment, in accordance with the present disclosure.

FIG. 8 is a diagram illustrating an example process 800 performed, for example, by a UE, in accordance with the present disclosure. Example process 800 is an example where the UE (e.g., UE 120 and/or the like) performs operations associated with sidelink-assisted positioning.

As shown in FIG. 8, in some aspects, process 800 may include transmitting, to another UE, a positioning request associated with a procedure for determining a position of the UE, wherein the positioning request comprises a sidelink communication between a first S-LMC of the UE and a second S-LMC of the other UE, wherein the first S-LMC and the second S-LMC comprise sub-functions associated with a V2X protocol layer (block 810). For example, the UE (e.g., using transmit processor 264, controller/processor 280, memory 282, and/or the like) may transmit, to another UE, a positioning request associated with a procedure for determining a position of the UE, as described above. In some aspects, the positioning request comprises a sidelink communication between a first S-LMC of the UE and a second S-LMC of the other UE. In some aspects, the first S-LMC and the second S-LMC comprise sub-functions associated with a V2X protocol layer.

As further shown in FIG. 8, in some aspects, process 800 may include receiving a positioning report associated with the procedure for determining the position of the UE, wherein the positioning report comprises an indication of the position of the UE based at least in part on a determination by an S-LMF (block 820). For example, the UE (e.g., using receive processor 258, controller/processor 280, memory 282, and/or the like) may receive a positioning report associated with the procedure for determining the position of the UE, as described above. In some aspects, the positioning report comprises an indication of the position of the UE based at least in part on a determination by an S-LMF.

Process 800 may include additional aspects, such as any single aspect or any combination of aspects described below and/or in connection with one or more other processes described elsewhere herein.

In a first aspect, each of the first S-LMC and the second S-LMC supports at least one of: a capability request operation, a capability response operation, an assistance data receipt operation, an assistance data provision operation, a measurement operation, a measurement receipt operation, a first location determination operation associated with the UE, a second location determination operation associated with the other UE, or a combination thereof.

In a second aspect, alone or in combination with the first aspect, the sidelink communication is performed using a PC5 signaling message.

In a third aspect, alone or in combination with one or more of the first and second aspects, the UE is associated with a vehicle.

In a fourth aspect, alone or in combination with one or more of the first through third aspects, the other UE is associated with a vehicle or a roadside unit.

In a fifth aspect, alone or in combination with one or more of the first through fourth aspects, process 800 includes receiving a capability request from the other UE.

In a sixth aspect, alone or in combination with one or more of the first through fifth aspects, process 800 includes providing, to the other UE, capability information associated with the UE.

In a seventh aspect, alone or in combination with the sixth aspect, the capability information associated with the UE indicates at least one of: one or more positioning measurements that the UE is capable of performing, a velocity sensor error, a calibration error, or a combination thereof.

In an eighth aspect, alone or in combination with one or more of the first through seventh aspects, process 800 includes receiving a set of assistance data from the other UE, wherein the set of assistance data comprises a set of PRS configuration information associated with at least one of: the UE, the other UE, or a combination thereof.

In a ninth aspect, alone or in combination with the eighth aspect, process 800 includes receiving an incoming PRS based at least in part on the set of assistance data; obtaining a positioning measurement based at least in part on the incoming PRS; and transmitting, to the other UE, at least one of: the positioning measurement, an error associated with the positioning measurement, or a combination thereof.

In a tenth aspect, alone or in combination with one or more of the eighth through ninth aspects, process 800 includes transmitting, to the other UE, an outgoing PRS based at least in part on the set of assistance data, wherein the outgoing PRS is to facilitate a positioning measurement obtained by the other UE; and receiving, from the other UE, at least one of: the positioning measurement, an error associated with the positioning measurement, or a combination thereof.

In an eleventh aspect, alone or in combination with one or more of the eighth through tenth aspects, process 800 includes transmitting, to the S-LMF, at least one of: the set of assistance data, a first positioning measurement obtained by the UE, an error associated with the first positioning measurement, a second positioning measurement received from the other UE, an error associated with the second positioning measurement, or a combination thereof.

In a twelfth aspect, alone or in combination with the eleventh aspect, the S-LMF is provided by a V2X application server, and the UE communicates with the S-LMF via a V1 interface.

In a thirteenth aspect, alone or in combination with the eleventh aspect, the S-LMF is provided by a wireless core network, and the UE communicates with the S-LMF via an LPP.

In a fourteenth aspect, alone or in combination with one or more of the first through thirteenth aspects, process 800 includes receiving a vehicle positioning measurement from a sensor associated with a vehicle corresponding to the UE; and transmitting, to the S-LMF, the vehicle positioning measurement.

In a fifteenth aspect, alone or in combination with the fourteenth aspect, the sensor comprises a wheel sensor.

In a sixteenth aspect, alone or in combination with one or more of the fourteenth through fifteenth aspects, the vehicle positioning measurement comprises velocity information.

In a seventeenth aspect, alone or in combination with one or more of the first through sixteenth aspects, process 800 includes transmitting an additional positioning request to a third UE, wherein the additional positioning request comprises an additional sidelink communication between the first S-LMC of the UE and a third S-LMC of the third UE.

In an eighteenth aspect, alone or in combination with the seventeenth aspect, process 800 includes receiving a first capability request from the other UE; receiving a second capability request from the third UE; providing, to the other UE, capability information associated with the UE; and providing, to the third UE, the capability information associated with the UE.

In a nineteenth aspect, alone or in combination with one or more of the seventeenth through eighteenth aspects, process 800 includes receiving a first set of assistance data from the other UE; and receiving a second set of assistance data from the third UE.

In a twentieth aspect, alone or in combination with the nineteenth aspect, the first set of assistance data comprises PRS configuration information associated with at least one of the UE, the other UE, or a combination thereof, and the second set of assistance data comprises PRS configuration information associated with at least one of the UE, the third UE, or a combination thereof.

In a twenty-first aspect, alone or in combination with the twentieth aspect, process 800 includes receiving a first PRS from the other UE based at least in part on the first set of assistance data; receiving a second PRS from the third UE based at least in part on the second set of assistance data; obtaining at least one positioning measurement based at least in part on at least one of: the first PRS, the second PRS, or a combination thereof; and transmitting the at least one positioning measurement to at least one of the other UE, the third UE, or a combination thereof.

In a twenty-second aspect, alone or in combination with the twentieth aspect, process 800 includes transmitting at least one of: a first outgoing PRS based at least in part on the first set of assistance data, a second outgoing PRS based at least in part on the second set of assistance data, or a combination thereof.

In a twenty-third aspect, alone or in combination with one or more of the seventeenth through twenty-second aspects, process 800 includes receiving a vehicle positioning measurement from a sensor associated with a vehicle corresponding to the UE; and transmitting, to at least one of the other UE, the third UE, or a combination thereof, at least one of: the vehicle positioning measurement, an error associated with the vehicle positioning measurement, or a combination thereof.

In a twenty-fourth aspect, alone or in combination with the twenty-third aspect, the sensor comprises a wheel sensor.

In a twenty-fifth aspect, alone or in combination with one or more of the twenty-third through twenty-fourth aspects, the vehicle positioning measurement comprises velocity information.

In a twenty-sixth aspect, alone or in combination with one or more of the seventeenth through twenty-fifth aspects, the UE receives the positioning report from at least one of: the other UE, the third UE, or a combination thereof.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
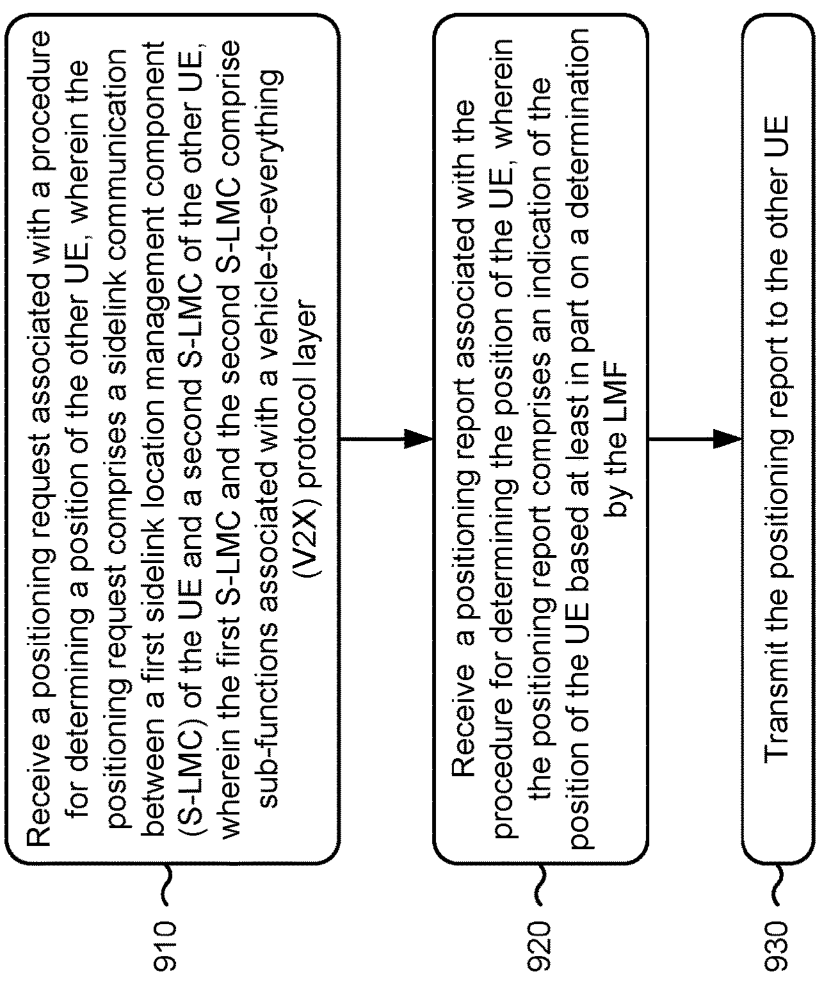

FIG. 9 is a diagram illustrating an example process 900 performed, for example, by a UE, in accordance with the present disclosure. Example process 900 is an example where the UE (e.g., UE 120 and/or the like) performs operations associated with sidelink-assisted positioning.

As shown in FIG. 9, in some aspects, process 900 may include receiving, from another UE, a positioning request associated with a procedure for determining a position of the other UE, wherein the positioning request comprises a sidelink communication between a S-LMC of the UE and a second S-LMC of the other UE, wherein the first S-LMC and the second S-LMC comprise sub-functions associated with a V2X protocol layer (block 910). For example, the UE (e.g., using receive processor 258, controller/processor 280, memory 282, and/or the like) may receive, from another UE, a positioning request associated with a procedure for determining a position of the other UE, as described above. In some aspects, the positioning request comprises a sidelink communication between a first S-LMC of the UE and a second S-LMC of the other UE. In some aspects, the first S-LMC and the second S-LMC comprise sub-functions associated with a V2X protocol layer.

As further shown in FIG. 9, in some aspects, process 900 may include receiving, from an S-LMF, a positioning report associated with the procedure for determining the position of the other UE, wherein the positioning report comprises an indication of the position of the UE based at least in part on a determination by the S-LMF (block 920). For example, the UE (e.g., using receive processor 258, controller/processor 280, memory 282, and/or the like) may receive, from an S-LMF, a positioning report associated with the procedure for determining the position of the other UE, as described above. In some aspects, the positioning report comprises an indication of the position of the UE based at least in part on a determination by the S-LMF.

As further shown in FIG. 9, in some aspects, process 900 may include transmitting the positioning report to the other UE (block 930). For example, the UE (e.g., using transmit processor 264, controller/processor 280, memory 282, and/or the like) may transmit the positioning report to the other UE, as described above.

Process 900 may include additional aspects, such as any single aspect or any combination of aspects described below and/or in connection with one or more other processes described elsewhere herein.

In a first aspect, each of the first S-LMC and the second S-LMC supports at least one of: a capability request operation, a capability response operation, an assistance data receipt operation, an assistance data provision operation, a measurement operation, a measurement receipt operation, a first location determination operation associated with the UE, a second location determination operation associated with the other UE, or a combination thereof.

In a second aspect, alone or in combination with the first aspect, the sidelink communication is performed using a PC5 signaling message.

In a third aspect, alone or in combination with one or more of the first and second aspects, the UE is associated with a vehicle or a roadside unit.

In a fourth aspect, alone or in combination with one or more of the first through third aspects, the other UE is associated with a vehicle.

In a fifth aspect, alone or in combination with one or more of the first through fourth aspects, process 900 includes transmitting a capability request to the other UE.

In a sixth aspect, alone or in combination with one or more of the first through fifth aspects, process 900 includes receiving, from the other UE, capability information associated with the other UE.

In a seventh aspect, alone or in combination with the sixth aspect, the capability information associated with the other UE indicates at least one of: one or more positioning measurements that the other UE is capable of performing, a velocity sensor error, a calibration error, or a combination thereof.

In an eighth aspect, alone or in combination with one or more of the first through seventh aspects, process 900 includes transmitting a set of assistance data to the other UE, wherein the set of assistance data comprises a set of PRS configuration information associated with at least one of: the UE, the other UE, or a combination thereof.

In a ninth aspect, alone or in combination with the eighth aspect, process 900 includes transmitting an outgoing PRS based at least in part on the set of assistance data; and receiving, from the other UE, at least one of: a positioning measurement based at least in part on the outgoing PRS, an error associated with the positioning measurement, or a combination thereof.

In a tenth aspect, alone or in combination with one or more of the eighth through ninth aspects, process 900 includes receiving, from the other UE, an incoming PRS based at least in part on the set of assistance data, wherein the incoming PRS is to facilitate a positioning measurement obtained by the UE and associated with the other UE; determining a positioning measurement based at least in part on the incoming PRS; and transmitting, to the other UE, at least one of: the positioning measurement, an error associated with the positioning measurement, or a combination thereof.

In an eleventh aspect, alone or in combination with one or more of the eighth through tenth aspects, process 900 includes transmitting, to the S-LMF, at least one of: the set of assistance data, a first positioning measurement obtained by the UE, an error associated with the first positioning measurement, a second positioning measurement received from the other UE, an error associated with the second positioning measurement, or a combination thereof.

In a twelfth aspect, alone or in combination with the eleventh aspect, the S-LMF is provided by a V2X application server, and the UE communicates with the S-LMF via a V1 interface.

In a thirteenth aspect, alone or in combination with the eleventh aspect, the S-LMF is provided by a wireless core network, and the UE communicates with the S-LMF via an LPP.

In a fourteenth aspect, alone or in combination with one or more of the first through thirteenth aspects, process 900 includes receiving a vehicle positioning measurement from the other UE, wherein the vehicle positioning measurement is based at least in part on a sensor associated with a vehicle corresponding to the other UE; and transmitting, to the S-LMF, the vehicle positioning measurement.

In a fifteenth aspect, alone or in combination with the fourteenth aspect, the sensor comprises a wheel sensor.

In a sixteenth aspect, alone or in combination with one or more of the fourteenth through fifteenth aspects, the vehicle positioning measurement comprises velocity information.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The following provides an overview of some Aspects of the present disclosure:

Aspect 1: A method of wireless communication performed by a user equipment (UE), comprising: transmitting, to another UE, a positioning request associated with a procedure for determining a position of the UE, wherein the positioning request comprises a sidelink communication between a first sidelink location management component (S-LMC) of the UE and a second S-LMC of the other UE, wherein the first S-LMC and the second S-LMC comprise sub-functions associated with a vehicle-to-everything (V2X) protocol layer; and receiving a positioning report associated with the procedure for determining the position of the UE, wherein the positioning report comprises an indication of the position of the UE based at least in part on a determination by a sidelink location management function (S-LMF).

Aspect 2: The method of Aspect 1, wherein each of the first S-LMC and the second S-LMC supports at least one of: a capability request operation, a capability response operation, an assistance data receipt operation, an assistance data provision operation, a measurement operation, a measurement receipt operation, a first location determination operation associated with the UE, a second location determination operation associated with the other UE, or a combination thereof.

Aspect 3: The method of either of Aspects 1 or 2, wherein the sidelink communication is performed using a PC5 signaling message.

Aspect 4: The method of any of Aspects 1-3, wherein the UE is associated with a vehicle.

Aspect 5: The method of any of Aspects 1-4, wherein the other UE is associated with a vehicle or a roadside unit.

Aspect 6: The method of any of Aspects 1-5, further comprising receiving a capability request from the other UE.

Aspect 7: The method of any of Aspects 1-6, further comprising providing, to the other UE, capability information associated with the UE.

Aspect 8: The method of Aspect 7, wherein the capability information associated with the UE indicates at least one of: one or more positioning measurements that the UE is capable of performing, a velocity sensor error, a calibration error, or a combination thereof.

Aspect 9: The method of any of Aspects 1-8, further comprising: receiving a set of assistance data from the other UE, wherein the set of assistance data comprises a set of positioning reference signal (PRS) configuration information associated with at least one of: the UE, the other UE, or a combination thereof.

Aspect 10: The method of Aspect 9, further comprising: receiving an incoming PRS based at least in part on the set of assistance data; obtaining a positioning measurement based at least in part on the incoming PRS; and transmitting, to the other UE, at least one of: the positioning measurement, an error associated with the positioning measurement, or a combination thereof.

Aspect 11: The method of either of Aspects 9 or 10, further comprising: transmitting, to the other UE, an outgoing PRS based at least in part on the set of assistance data, wherein the outgoing PRS is to facilitate a positioning measurement obtained by the other UE; and receiving, from the other UE, at least one of: the positioning measurement, an error associated with the positioning measurement, or a combination thereof.

Aspect 12: The method of any of Aspects 9-11, further comprising transmitting, to the S-LMF, at least one of: the set of assistance data, a first positioning measurement obtained by the UE, an error associated with the first positioning measurement, a second positioning measurement received from the other UE, an error associated with the second positioning measurement, or a combination thereof.

Aspect 13: The method of Aspect 12, wherein the S-LMF is provided by a V2X application server, and wherein the UE communicates with the S-LMF via a V1 interface.

Aspect 14: The method of Aspect 12, wherein the S-LMF is provided by a wireless core network, and wherein the UE communicates with the S-LMF via a long term evolution positioning protocol.

Aspect 15: The method of any of Aspects 1-14, further comprising: receiving a vehicle positioning measurement from a sensor associated with a vehicle corresponding to the UE; and transmitting, to the S-LMF, the vehicle positioning measurement.

Aspect 16: The method of Aspect 15, wherein the sensor comprises a wheel sensor.

Aspect 17: The method of either of Aspects 15 or 16, wherein the vehicle positioning measurement comprises velocity information.

Aspect 18: The method of any of Aspects 1-17, further comprising: transmitting an additional positioning request to a third UE, wherein the additional positioning request comprises an additional sidelink communication between the first S-LMC of the UE and a third S-LMC of the third UE.

Aspect 19: The method of Aspect 18, further comprising: receiving a first capability request from the other UE; receiving a second capability request from the third UE; providing, to the other UE, capability information associated with the UE; and providing, to the third UE, the capability information associated with the UE.

Aspect 20: The method of either of Aspects 18 or 19, further comprising: receiving a first set of assistance data from the other UE; and receiving a second set of assistance data from the third UE.

Aspect 21: The method of Aspect 20, wherein the first set of assistance data comprises positioning reference signal (PRS) configuration information associated with at least one of the UE, the other UE, or a combination thereof, and wherein the second set of assistance data comprises PRS configuration information associated with at least one of the UE, the third UE, or a combination thereof.

Aspect 22: The method of Aspect 21, further comprising: receiving a first PRS from the other UE based at least in part on the first set of assistance data; receiving a second PRS from the third UE based at least in part on the second set of assistance data; obtaining at least one positioning measurement based at least in part on at least one of: the first PRS, the second PRS, or a combination thereof; and transmitting the at least one positioning measurement to at least one of the other UE, the third UE, or a combination thereof.

Aspect 23: The method of Aspect 21, further comprising transmitting at least one of: a first outgoing PRS based at least in part on the first set of assistance data, a second outgoing PRS based at least in part on the second set of assistance data, or a combination thereof.

Aspect 24: The method of any of Aspects 18-23, further comprising: receiving a vehicle positioning measurement from a sensor associated with a vehicle corresponding to the UE; and transmitting, to at least one of the other UE, the third UE, or a combination thereof, at least one of: the vehicle positioning measurement, an error associated with the vehicle positioning measurement, or a combination thereof.

Aspect 25: The method of Aspect 24, wherein the sensor comprises a wheel sensor.

Aspect 26: The method of either of Aspects 24 or 25, wherein the vehicle positioning measurement comprises velocity information.

Aspect 27: The method of any of Aspects 18-26, wherein the UE receives the positioning report from at least one of: the other UE, the third UE, or a combination thereof.

Aspect 28: A method of wireless communication performed by a user equipment (UE), comprising: receiving, from another UE, a positioning request associated with a procedure for determining a position of the other UE, wherein the positioning request comprises a sidelink communication between a first sidelink location management component (S-LMC) of the UE and a second S-LMC of the other UE, wherein the first S-LMC and the second S-LMC comprise sub-functions associated with a vehicle-to-everything (V2X) protocol layer; receiving, from a sidelink location management function (S-LMF), a positioning report associated with the procedure for determining the position of the other UE, wherein the positioning report comprises an indication of the position of the UE based at least in part on a determination by the S-LMF; and transmitting the positioning report to the other UE.

Aspect 29: The method of Aspect 28, wherein each of the first S-LMC and the second S-LMC supports at least one of: a capability request operation, a capability response operation, an assistance data receipt operation, an assistance data provision operation, a measurement operation, a measurement receipt operation, a first location determination operation associated with the UE, a second location determination operation associated with the other UE, or a combination thereof.

Aspect 30: The method of either of Aspects 28 or 29, wherein the sidelink communication is performed using a PC5 signaling message.

Aspect 31: The method of any of Aspects 28-30, wherein the UE is associated with a vehicle or a roadside unit.

Aspect 32: The method of any of Aspects 28-31, wherein the other UE is associated with a vehicle.

Aspect 33: The method of any of Aspects 28-32, further comprising transmitting a capability request to the other UE.

Aspect 34: The method of any of Aspects 28-33, further comprising receiving, from the other UE, capability information associated with the other UE.

Aspect 35: The method of Aspect 34, wherein the capability information associated with the other UE indicates at least one of: one or more positioning measurements that the other UE is capable of performing, a velocity sensor error, a calibration error, or a combination thereof.

Aspect 36: The method of any of Aspects 28-35, further comprising: transmitting a set of assistance data to the other UE, wherein the set of assistance data comprises a set of positioning reference signal (PRS) configuration information associated with at least one of: the UE, the other UE, or a combination thereof.

Aspect 37: The method of Aspect 36, further comprising: transmitting an outgoing PRS based at least in part on the set of assistance data; and receiving, from the other UE, at least one of: a positioning measurement based at least in part on the outgoing PRS, an error associated with the positioning measurement, or a combination thereof.

Aspect 38: The method of either of Aspects 36 or 37, further comprising: receiving, from the other UE, an incoming PRS based at least in part on the set of assistance data, wherein the incoming PRS is to facilitate a positioning measurement obtained by the UE and associated with the other UE; determining a positioning measurement based at least in part on the incoming PRS; and transmitting, to the other UE, at least one of: the positioning measurement, an error associated with the positioning measurement, or a combination thereof.

Aspect 39: The method of any of Aspects 36-38, further comprising transmitting, to the S-LMF, at least one of: the set of assistance data, a first positioning measurement obtained by the UE, an error associated with the first positioning measurement, a second positioning measurement received from the other UE, an error associated with the second positioning measurement, or a combination thereof.

Aspect 40: The method of Aspect 39, wherein the S-LMF is provided by a V2X application server, and wherein the UE communicates with the S-LMF via a V1 interface.

Aspect 41: The method of Aspect 39, wherein the S-LMF is provided by a wireless core network, and wherein the UE communicates with the S-LMF via a long term evolution positioning protocol.

Aspect 42: The method of any of Aspects 28-41, further comprising: receiving a vehicle positioning measurement from the other UE, wherein the vehicle positioning measurement is based at least in part on a sensor associated with a vehicle corresponding to the other UE; and transmitting, to the S-LMF, the vehicle positioning measurement.

Aspect 43: The method of Aspect 42, wherein the sensor comprises a wheel sensor.

Aspect 44: The method of either of Aspects 42 or 43, wherein the vehicle positioning measurement comprises velocity information.

Aspect 45: An apparatus for wireless communication at a device, comprising a processor; memory coupled with the processor; and instructions stored in the memory and executable by the processor to cause the apparatus to perform the method of one or more Aspects of Aspects 1-27.

Aspect 46: A device for wireless communication, comprising a memory and one or more processors coupled to the memory, the memory and the one or more processors configured to perform the method of one or more Aspects of Aspects 1-27.

Aspect 47: An apparatus for wireless communication, comprising at least one means for performing the method of one or more Aspects of Aspects 1-27.

Aspect 48: A non-transitory computer-readable medium storing code for wireless communication, the code comprising instructions executable by a processor to perform the method of one or more Aspects of Aspects 1-27.

Aspect 49: A non-transitory computer-readable medium storing a set of instructions for wireless communication, the set of instructions comprising one or more instructions that, when executed by one or more processors of a device, cause the device to perform the method of one or more Aspects of Aspects 1-27.

Aspect 50: An apparatus for wireless communication at a device, comprising a processor; memory coupled with the processor; and instructions stored in the memory and executable by the processor to cause the apparatus to perform the method of one or more Aspects of Aspects 28-44.

Aspect 51: A device for wireless communication, comprising a memory and one or more processors coupled to the memory, the memory and the one or more processors configured to perform the method of one or more Aspects of Aspects 28-44.

Aspect 52: An apparatus for wireless communication, comprising at least one means for performing the method of one or more Aspects of Aspects 28-44.

Aspect 53: A non-transitory computer-readable medium storing code for wireless communication, the code comprising instructions executable by a processor to perform the method of one or more Aspects of Aspects 28-44.

Aspect 54: A non-transitory computer-readable medium storing a set of instructions for wireless communication, the set of instructions comprising one or more instructions that, when executed by one or more processors of a device, cause the device to perform the method of one or more Aspects of Aspects 28-44.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

one or more transceivers;

a memory; and one or more processors coupled to the one or more transceivers and the memory, the memory and the one or more processors configured to:

receive, via the one or more transceivers, a capability request from another UE, wherein the capability request is associated with one or more positioning measurements that the UE is capable of performing;

provide, to the other UE via the one or more transceivers, capability information associated with the UE, wherein the capability information associated with the UE indicates the one or more positioning measurements that the UE is capable of performing;

transmit, to the other UE via the one or more transceivers, a positioning request associated with a procedure for determining a position of the UE, wherein the positioning request comprises a sidelink communication, performed using PC5 signaling, between a first sidelink location management component (S-LMC) of the UE and a second S-LMC of the other UE; and receive, via the one or more transceivers, a positioning report associated with the procedure for determining the position of the UE, wherein the positioning report comprises an indication of the position of the UE.

2. The UE of claim 1, wherein each of the first S-LMC and the second S-LMC supports at least one of:

a capability request operation, a capability response operation, an assistance data receipt operation, an assistance data provision operation, a measurement operation, a measurement receipt operation, a first location determination operation associated with the UE, a second location determination operation associated with the other UE, or a combination thereof.

3. The UE of claim 1, wherein the UE is associated with a vehicle, and wherein the other UE is associated with a vehicle or a roadside unit.

4. The UE of claim 1, wherein the memory and the one or more processors are further configured to:

receive, via the one or more transceivers, a set of assistance data from the other UE, wherein the set of assistance data comprises a set of positioning reference signal (PRS) configuration information associated with at least one of:

the UE, the other UE, or a combination thereof.

5. The UE of claim 4, wherein the memory and the one or more processors are further configured to:

receive, via the one or more transceivers, an incoming PRS based at least in part on the set of assistance data;

obtain a positioning measurement based at least in part on the incoming PRS; and transmit, to the other UE via the one or more transceivers, at least one of:

the positioning measurement, an error associated with the positioning measurement, or a combination thereof.

6. The UE of claim 4, wherein the memory and the one or more processors are further configured to:

transmit, to the other UE via the one or more transceivers, an outgoing PRS based at least in part on the set of assistance data, wherein the outgoing PRS is to facilitate a positioning measurement obtained by the other UE; and receive, from the other UE via the one or more transceivers, at least one of:

the positioning measurement, an error associated with the positioning measurement, or a combination thereof.

7. The UE of claim 4, wherein the memory and the one or more processors are further configured to transmit, to a sidelink location management function (S-LMF) via the one or more transceivers, at least one of:

the set of assistance data, a first positioning measurement obtained by the UE, an error associated with the first positioning measurement, a second positioning measurement received from the other UE, an error associated with the second positioning measurement, or a combination thereof.

8. The UE of claim 7, wherein the S-LMF is provided by a V2X application server, and wherein the UE communicates with the S-LMF via a V1 interface.

9. The UE of claim 7, wherein the S-LMF is provided by a wireless core network, and wherein the UE communicates with the S-LMF via a long term evolution positioning protocol.

10. The UE of claim 1, wherein the memory and the one or more processors are further configured to:

receive, via the one or more transceivers, a vehicle positioning measurement from a sensor associated with a vehicle corresponding to the UE; and transmit, to a sidelink location management function (S-LMF) via the one or more transceivers, the vehicle positioning measurement.

11. The UE of claim 10, wherein the sensor comprises a wheel sensor, and wherein the vehicle positioning measurement comprises velocity information.

12. The UE of claim 1, wherein the memory and the one or more processors are further configured to:

transmit, via the one or more transceivers, an additional positioning request to a third UE, wherein the additional positioning request comprises an additional sidelink communication between the first S-LMC of the UE and a third S-LMC of the third UE.

13. The UE of claim 12, wherein the memory and the one or more processors are further configured to:

receive, via the one or more transceivers, a first capability request from the other UE;

receive, via the one or more transceivers, a second capability request from the third UE;

provide, to the other UE via the one or more transceivers, capability information associated with the UE; and provide, to the third UE via the one or more transceivers, the capability information associated with the UE.

14. The UE of claim 12, wherein the memory and the one or more processors are further configured to:

receive, via the one or more transceivers, a first set of assistance data from the other UE; and receive, via the one or more transceivers, a second set of assistance data from the third UE.

15. The UE of claim 14, wherein the first set of assistance data comprises positioning reference signal (PRS) configuration information associated with at least one of the UE, the other UE, or a combination thereof, and wherein the second set of assistance data comprises PRS configuration information associated with at least one of the UE, the third UE, or a combination thereof.

16. The UE of claim 15, wherein the memory and the one or more processors are further configured to:

receive, via the one or more transceivers, a first PRS from the other UE based at least in part on the first set of assistance data;

receive, via the one or more transceivers, a second PRS from the third UE based at least in part on the second set of assistance data;

obtain at least one positioning measurement based at least in part on at least one of:

the first PRS, the second PRS, or a combination thereof; and transmit, via the one or more transceivers, the at least one positioning measurement to at least one of the other UE, the third UE, or a combination thereof.

17. The UE of claim 15, wherein the memory and the one or more processors are further configured to transmit, via the one or more transceivers, at least one of:

a first outgoing PRS based at least in part on the first set of assistance data, a second outgoing PRS based at least in part on the second set of assistance data, or a combination thereof.

18. The UE of claim 12, wherein the memory and the one or more processors are further configured to:

receive, via the one or more transceivers, a vehicle positioning measurement from a sensor associated with a vehicle corresponding to the UE; and transmit, via the one or more transceivers, to at least one of the other UE, the third UE, or a combination thereof, at least one of:

the vehicle positioning measurement, an error associated with the vehicle positioning measurement, or a combination thereof.

19. The UE of claim 18, wherein the sensor comprises a wheel sensor, and wherein the vehicle positioning measurement comprises velocity information.

20. The UE of claim 12, wherein the UE receives, via the one or more transceivers, the positioning report from at least one of:

the other UE, the third UE, or a combination thereof.

21. The UE of claim 1, wherein the PC5 signaling corresponds to a direct link between the UE and the other UE.

22. The UE of claim 1, wherein the capability information associated with the UE further indicates at least one of a velocity sensor error or a calibration error.

23. The UE of claim 1, wherein the first S-LMC and the second S-LMC comprise sub-functions associated with a vehicle-to-everything (V2X) protocol layer.

24. The UE of claim 1, wherein the positioning report comprises the indication of the position of the UE based at least in part on a determination by a sidelink location management function (S-LMF).

25. A user equipment (UE) for wireless communication, comprising:

one or more transceivers;

a memory; and one or more processors coupled to the one or more transceivers and the memory, the memory and the one or more processors configured to:

provide, via the one or more transceivers, a capability request from another UE, wherein the capability request is associated with one or more positioning measurements that the UE is capable of performing;

receive, from the other UE via the one or more transceivers, capability information associated with the other UE, wherein the capability information associated with the other UE indicates the one or more positioning measurements that the other UE is capable of performing;

receive, from the other UE via the one or more transceivers, a positioning request associated with a procedure for determining a position of the other UE, wherein the positioning request comprises a sidelink communication, performed using PC5 signaling, between a first sidelink location management component (S-LMC) of the UE and a second S-LMC of the other UE;

receive, from a sidelink location management function (S-LMF) via the one or more transceivers, a positioning report associated with the procedure for determining the position of the other UE, wherein the positioning report comprises an indication of the position of the UE; and transmit, via the one or more transceivers, the positioning report to the other UE.

26. The UE of claim 25, wherein each of the first S-LMC and the second S-LMC supports at least one of:

a capability request operation, a capability response operation, an assistance data receipt operation, an assistance data provision operation, a measurement operation,
a measurement receipt operation,
a first location determination operation associated with the UE,
a second location determination operation associated with the other UE, or
a combination thereof.

27. The UE of claim 25,
wherein the UE is associated with a vehicle or a roadside unit.

28. The UE of claim 25,
wherein the other UE is associated with a vehicle.

29. The UE of claim 25,
wherein the one or more processors are further configured to:
transmit, via the one or more transceivers, a set of assistance data to the other UE, wherein the set of assistance data comprises a set of positioning reference signal (PRS) configuration information associated with at least one of:
the UE,
the other UE, or
a combination thereof.

30. The UE of claim 29,
wherein the one or more processors are further configured to:
transmit, via the one or more transceivers, an outgoing PRS based at least in part on the set of assistance data; and
receive, from the other UE via the one or more transceivers, at least one of:
a positioning measurement based at least in part on the outgoing PRS,
an error associated with the positioning measurement, or
a combination thereof.

31. The UE of claim 29,
wherein the one or more processors are further configured to:
receive, from the other UE via the one or more transceivers, an incoming PRS based at least in part on the set of assistance data, wherein the incoming PRS is to facilitate a positioning measurement obtained by the UE and associated with the other UE;
determine a positioning measurement based at least in part on the incoming PRS; and
transmit, to the other UE via the one or more transceivers, at least one of:
the positioning measurement,
an error associated with the positioning measurement, or
a combination thereof.

32. The UE of claim 29,
wherein the one or more processors are further configured to transmit, to the S-LMF via the one or more transceivers, at least one of:
the set of assistance data,
a first positioning measurement obtained by the UE,
an error associated with the first positioning measurement,
a second positioning measurement received from the other UE,
an error associated with the second positioning measurement, or
a combination thereof.

33. The UE of claim 32,
wherein the S-LMF is provided by a V2X application server, and
wherein the UE communicates with the S-LMF via a V1 interface.

34. The UE of claim 32,
wherein the S-LMF is provided by a wireless core network, and
wherein the UE communicates with the S-LMF via a long term evolution positioning protocol.

35. The UE of claim 25,
wherein the one or more processors are further configured to:
receive, via the one or more transceivers, a vehicle positioning measurement from the other UE, wherein the vehicle positioning measurement is based at least in part on a sensor associated with a vehicle corresponding to the other UE; and
transmit, to the S-LMF via the one or more transceivers, the vehicle positioning measurement.

36. The UE of claim 35,
wherein the sensor comprises a wheel sensor.

37. The UE of claim 35,
wherein the vehicle positioning measurement comprises velocity information.

38. The UE of claim 25, wherein the PC5 signaling corresponds to a direct link between the UE and the other UE.

39. The UE of claim 25, wherein the capability information associated with the UE further indicates at least one of a velocity sensor error or a calibration error.

40. A method of wireless communication performed by a user equipment (UE), comprising:
receiving a capability request from another UE, wherein the capability request is associated with one or more positioning measurements that the UE is capable of performing;
providing, to the other UE, capability information associated with the UE, wherein the capability information associated with the UE indicates the one or more positioning measurements that the UE is capable of performing;
transmitting, to the other UE, a positioning request associated with a procedure for determining a position of the UE, wherein the positioning request comprises a sidelink communication, performed using PC5 signaling, between a first sidelink location management component (S-LMC) of the UE and a second S-LMC of the other UE; and
receiving a positioning report associated with the procedure for determining the position of the UE, wherein the positioning report comprises an indication of the position of the UE.

41. The method of claim 40,
wherein each of the first S-LMC and the second S-LMC supports at least one of:
a capability request operation,
a capability response operation,
an assistance data receipt operation,
an assistance data provision operation,
a measurement operation,
a measurement receipt operation,
a first location determination operation associated with the UE,
a second location determination operation associated with the other UE, or
a combination thereof.

42. The method of claim 40, wherein the UE is associated with a vehicle.

43. The method of claim 40, wherein the other UE is associated with a vehicle or a roadside unit.

44. The method of claim 40, further comprising:
receiving a set of assistance data from the other UE, wherein the set of assistance data comprises a set of positioning reference signal (PRS) configuration information associated with at least one of:
the UE,
the other UE, or
a combination thereof.

45. The method of claim 44, further comprising:
receiving an incoming PRS based at least in part on the set of assistance data;
obtaining a positioning measurement based at least in part on the incoming PRS; and
transmitting, to the other UE, at least one of:
the positioning measurement,
an error associated with the positioning measurement, or
a combination thereof.

46. The method of claim 44, further comprising:
transmitting, to the other UE, an outgoing PRS based at least in part on the set of assistance data, wherein the outgoing PRS is to facilitate a positioning measurement obtained by the other UE; and
receiving, from the other UE, at least one of:
the positioning measurement,
an error associated with the positioning measurement, or
a combination thereof.

47. The method of claim 44, further comprising
transmitting, to a sidelink location management function (S-LMF), at least one of:
the set of assistance data,
a first positioning measurement obtained by the UE,
an error associated with the first positioning measurement,
a second positioning measurement received from the other UE,
an error associated with the second positioning measurement, or
a combination thereof.

48. The method of claim 47,
wherein the S-LMF is provided by a V2X application server, and
wherein the UE communicates with the S-LMF via a V1 interface.

49. The method of claim 47,
wherein the S-LMF is provided by a wireless core network, and
wherein the UE communicates with the S-LMF via a long term evolution positioning protocol.

50. The method of claim 40, further comprising:
receiving a vehicle positioning measurement from a sensor associated with a vehicle corresponding to the UE; and
transmitting, to a sidelink location management function (S-LMF), the vehicle positioning measurement.

51. The method of claim 50, wherein the sensor comprises a wheel sensor.

52. The method of claim 50, wherein the vehicle positioning measurement comprises velocity information.

53. The method of claim 40, further comprising:
transmitting an additional positioning request to a third UE, wherein the additional positioning request comprises an additional sidelink communication between the first S-LMC of the UE and a third S-LMC of the third UE.

54. The method of claim 53, further comprising:
receiving a first capability request from the other UE;
receiving a second capability request from the third UE;
providing, to the other UE, capability information associated with the UE; and
providing, to the third UE, the capability information associated with the UE.

55. The method of claim 53, further comprising:
receiving a first set of assistance data from the other UE; and
receiving a second set of assistance data from the third UE.

56. The method of claim 55,
wherein the first set of assistance data comprises positioning reference signal (PRS) configuration information associated with at least one of the UE, the other UE, or a combination thereof, and
wherein the second set of assistance data comprises PRS configuration information associated with at least one of the UE, the third UE, or a combination thereof.

57. The method of claim 56, further comprising:
receiving a first PRS from the other UE based at least in part on the first set of assistance data;
receiving a second PRS from the third UE based at least in part on the second set of assistance data;
obtaining at least one positioning measurement based at least in part on at least one of:
the first PRS,
the second PRS, or
a combination thereof; and
transmitting the at least one positioning measurement to at least one of the other UE, the third UE, or a combination thereof.

58. The method of claim 56, further comprising
transmitting at least one of:
a first outgoing PRS based at least in part on the first set of assistance data,
a second outgoing PRS based at least in part on the second set of assistance data, or
a combination thereof.

59. The method of claim 53, further comprising:
receiving a vehicle positioning measurement from a sensor associated with a vehicle corresponding to the UE; and
transmitting, to at least one of the other UE, the third UE, or a combination thereof, at least one of:
the vehicle positioning measurement,
an error associated with the vehicle positioning measurement, or
a combination thereof.

60. The method of claim 59, wherein the sensor comprises a wheel sensor.

61. The method of claim 59, wherein the vehicle positioning measurement comprises velocity information.

62. The method of claim 53,
wherein the UE receives the positioning report from at least one of:
the other UE,
the third UE, or
a combination thereof.

63. The method of claim 40, wherein the PC5 signaling corresponds to a direct link between the UE and the other UE.

64. A method of wireless communication performed by a user equipment (UE), comprising:

providing a capability request from another UE, wherein the capability request is associated with one or more positioning measurements that the UE is capable of performing;

receiving, from the other UE, capability information associated with the other UE, wherein the capability information associated with the other UE indicates one or more positioning measurements that the other UE is capable of performing;

receiving, from the other UE, a positioning request associated with a procedure for determining a position of the other UE, wherein the positioning request comprises a sidelink communication, performed using PC5 signaling, between a first sidelink location management component (S-LMC) of the UE and a second S-LMC of the other UE;

receiving, from a sidelink location management function (S-LMF), a positioning report associated with the procedure for determining the position of the other UE, wherein the positioning report comprises an indication of the position of the UE; and transmitting the positioning report to the other UE.

65. The method of claim 64, wherein each of the first S-LMC and the second S-LMC supports at least one of:

a capability request operation, a capability response operation, an assistance data receipt operation, an assistance data provision operation, a measurement operation, a measurement receipt operation, a first location determination operation associated with the UE, a second location determination operation associated with the other UE, or a combination thereof.

66. The method of claim 64, wherein the UE is associated with a vehicle or a roadside unit.

67. The method of claim 64, wherein the other UE is associated with a vehicle.

68. The method of claim 64, further comprising:

transmitting a set of assistance data to the other UE, wherein the set of assistance data comprises a set of positioning reference signal (PRS) configuration information associated with at least one of:

the UE, the other UE, or a combination thereof.

69. The method of claim 68, further comprising:

transmitting an outgoing PRS based at least in part on the set of assistance data; and receiving, from the other UE, at least one of:

a positioning measurement based at least in part on the outgoing PRS, an error associated with the positioning measurement, or a combination thereof.

70. The method of claim 68, further comprising:

receiving, from the other UE, an incoming PRS based at least in part on the set of assistance data, wherein the incoming PRS is to facilitate a positioning measurement obtained by the UE and associated with the other UE;

determining a positioning measurement based at least in part on the incoming PRS; and transmitting, to the other UE, at least one of:

the positioning measurement, an error associated with the positioning measurement, or a combination thereof.

71. The method of claim 68, further comprising transmitting, to the S-LMF, at least one of:

the set of assistance data, a first positioning measurement obtained by the UE, an error associated with the first positioning measurement, a second positioning measurement received from the other UE, an error associated with the second positioning measurement, or a combination thereof.

72. The method of claim 71, wherein the S-LMF is provided by a V2X application server, and wherein the UE communicates with the S-LMF via a VI interface.

73. The method of claim 71, wherein the S-LMF is provided by a wireless core network, and wherein the UE communicates with the S-LMF via a long term evolution positioning protocol.

74. The method of claim 64, further comprising:

receiving a vehicle positioning measurement from the other UE, wherein the vehicle positioning measurement is based at least in part on a sensor associated with a vehicle corresponding to the other UE; and transmitting, to the S-LMF, the vehicle positioning measurement.

75. The method of claim 74, wherein the sensor comprises a wheel sensor.

76. The method of claim 74, wherein the vehicle positioning measurement comprises velocity information.

77. The method of claim 64, wherein the PC5 signaling corresponds to a direct link between the UE and the other UE.

* * * * *